US006637020B1

(12) United States Patent
Hammond

(10) Patent No.: US 6,637,020 B1
(45) Date of Patent: Oct. 21, 2003

(54) CREATING APPLICATIONS WITHIN DATA PROCESSING SYSTEMS BY COMBINING PROGRAM COMPONENTS DYNAMICALLY

(75) Inventor: Barton Wade Hammond, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,891

(22) Filed: Dec. 3, 1998

(51) Int. Cl.[7] ................................................. G06F 9/44
(52) U.S. Cl. ....................... 717/107; 717/108; 717/140; 709/332
(58) Field of Search ................................. 717/120–123, 717/140–147, 106–108; 707/100–104, 107, 111; 709/202, 217, 331, 213, 332; 710/33

(56) References Cited

U.S. PATENT DOCUMENTS

| 5,522,024 | A | * | 5/1996 | Hiraga et al. ................. 345/866 |
| 5,642,511 | A | | 6/1997 | Chow et al. |
| 5,764,989 | A | * | 6/1998 | Gustafsson et al. ......... 717/129 |
| 5,864,866 | A | | 1/1999 | Henckel et al. |
| 5,881,230 | A | | 3/1999 | Christensen et al. |
| 5,903,725 | A | | 5/1999 | Colyer |
| 5,920,868 | A | | 7/1999 | Fowlow et al. |
| 5,987,247 | A | | 11/1999 | Lau |
| 6,014,666 | A | | 1/2000 | Helland et al. |
| 6,038,395 | A | | 3/2000 | Chow et al. |
| 6,085,030 | A | | 7/2000 | Whitehead et al. |
| 6,094,655 | A | | 7/2000 | Rogers et al. |
| 6,122,627 | A | | 9/2000 | Carey et al. |
| 6,125,383 | A | * | 9/2000 | Glynias et al. ............. 709/202 |
| 6,151,700 | A | * | 11/2000 | Fox ............................. 717/107 |
| 6,189,138 | B1 | | 2/2001 | Fowlow et al. |
| 6,263,492 | B1 | * | 7/2001 | Fraley et al. ................ 717/107 |
| 6,266,716 | B1 | * | 7/2001 | Wilson et al. .............. 709/213 |
| 6,292,827 | B1 | * | 9/2001 | Raz ............................. 709/217 |
| 6,336,118 | B1 | * | 1/2002 | Hammond .............. 707/103 Y |
| 6,356,931 | B2 | | 3/2002 | Ismael et al. |
| 6,370,681 | B1 | * | 4/2002 | Dellarocas et al. ......... 707/103 |
| 6,374,308 | B1 | | 4/2002 | Kempf et al. |
| 6,381,654 | B1 | * | 4/2002 | Brawn et al. ............... 709/331 |

OTHER PUBLICATIONS

U.S. patent application Ser. No. 09/204,892, Hammond, filed Dec. 3, 1998.
U.S. patent application Ser. No. 09/204,918, Hammond, filed Dec. 3, 1998.
Orfali, et al., "The Essential Distributed Objects Survival Guide", pp. 21–42, 47–65, 67–90, 123–138, 313–338, and 429–452.

\* cited by examiner

*Primary Examiner*—Tuan Q. Dam
*Assistant Examiner*—Lawrence Shrader
(74) *Attorney, Agent, or Firm*—David A. Mims, Jr.; Bracewell & Patterson, L.L.P.

(57) ABSTRACT

A method of associating program components to create a software application. Program components are emitted from standard object data files. The program components are analyzed in real time to identify patterns that conform to pre-defined classes. Then, the program components are introspected and connected together dynamically utilizing the components' class characteristics to create a software application or routine.

27 Claims, 9 Drawing Sheets

Legend

Original Candidate

Example Candidate

Legend

Original Candidate

Legend

Original Candidate

Example Candidate

Legend
 Category

CREATING APPLICATIONS WITHIN DATA PROCESSING SYSTEMS BY COMBINING PROGRAM COMPONENTS DYNAMICALLY

RELATED APPLICATIONS

The present invention is related to the subject matter of the following commonly assigned, issued U.S. Pat. No. 6,336,118 entitled "Framework Within a Data Processing System for Manipulating Program Objects" and issued Jan. 1, 2002; and copending U.S. Pat. application Ser. No. 09/204,892 entitled "Client Side Graphical User Interface With Object Oriented Programming Environment Functionality" and filed Dec. 3, 1998. The content of the above-referenced applications is incorporated herein by reference.

BACKGROUND OF THE INVENTION

1. Technical Field

The present invention relates to an improved method of developing applications for data processing systems, and in particular to provide such an improved method wherein applications are created utilizing object-oriented programming components. Still more particularly, the present invention relates to an improved method of developing applications for data processing systems utilizing object-oriented programming language within a distributed object oriented system environment wherein program components are wired dynamically to create client side applications.

2. Description of the Related Art

A generalized structure for a conventional data processing system includes one or more processing units connected to a system memory device (random access memory or RAM) and to various peripheral, or input/output (I/O) devices. The I/O devices typically include a display monitor, a keyboard, a graphical pointer (mouse), and a permanent storage device (hard disk). The system memory device is utilized by a processing unit in carrying out program instructions, and stores: those instructions as well as data values that are fed to or generated by the programs. A processing unit communicates with the other components by various means, including one or more interconnects (buses), or direct access channels. A data processing system may have many additional components, such as serial and parallel ports for connection to, e.g., printers, and network adapters. Other components might further be utilized in conjunction with the foregoing; for example, a display adapter might be utilized to control a video display monitor, and a memory controller can be utilized to access the system memory, etc.

FIG. 1 depicts the basic structure of a conventional data processing system 10. Data processing system 10 has at least one central processing unit (CPU) or processor 12 which is connected to several peripheral devices, including input/output devices 14 (such as a display monitor, keyboard, and graphical pointing device) for the user interface, a permanent memory device 16 (such as a hard disk) for storing the data processor's operating system and user programs, and a temporary memory device 18 (such as random access memory or RAM) that is utilized by processor 12 to carry out program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and USB ports for connection to, e.g., modems or printers. Those skilled in the art will further appreciate that there are other components that might be utilized in conjunction with those shown in the block diagram of FIG. 1; for example, a display adapter connected to processor 12 might be utilized to control a video display monitor, and a memory controller may be utilized as an interface between temporary its memory device 18 and processor 12. Data processing system 10 also includes firmware 24 whose primary purpose is to seek out and load an operating system from one of the peripherals (usually permanent memory device 16) whenever data processing system 10 is first turned on.

The operation of data processing systems of the type depicted in FIG. 1 is well known in the art. Program information comprising instructions and/or data is stored on permanent memory device 16 and may be selectively copied into temporary memory device 18 once data processing system 10 is powered on. Processor 12 executes the instructions within such program information and generates text or graphical information for presentation on display output device connected via graphics adapter, where the information may be viewed by a user. The user may selectively control operation of data processing system 10 through input entered on one of input/output devices 14.

A data processing system program is accordingly a set of program instructions which are adapted to perform certain functions by acting upon, or in response to, the I/O devices. Program instructions that are carried out by the processor are, at that lowest level, binary in form, i.e., a series of ones and zeros. These executable (machine-readable) program instructions are produced from higher-level instructions written in a programming language. The programming language may still be low-level such as assembly language (which is difficult to utilize since instructions appear as hexadecimal bytes), or may be a higher level language in which instructions are created utilizing more easily understood words and symbols.

In an attempt to simplify programming, and yet still provide powerful development tools, programmers have created "object-oriented" programming languages in which each variable, function, etc., can be considered an object of a particular class. Object oriented programming is governed by the Common Object Request Broker Architecture (CORBA) standard which originates from the Core Object Model.

The main goals of the Core Object Model are portability and interoperability. Interoperability means being able to invoke operations on objects regardless of where they are located, which platform they execute on, or what programming language they are implemented in. This is achieved by the Object Request Broker (ORB), which relies on the semantics of objects and operations described in the Core Object Model. The ORB also requires some extensions to the core which provide specifications for specific communication protocols, an interface definition syntax, and basic services to object implementations. CORBA provides several extensions: Objects, defined simply as models of entities or concepts; Operations signatures (parameters and return values) where an operation is an action offered by an object which is known to the outside world by its signature. Further, an operation's signature has the following components: a name, a set of parameters, and a set of result types. Operation signatures are unique within a particular object.

An interface is a collection of operation signatures and attributes. Typically, the interface to an object is the set of operations offered by that object. Interfaces are related to one another by substitutability relationships. This means that an object offering an interface can be utilized in place of an object offering a "similar" interface. The Core Object Model simply defines substitutability as being able to utilize one interface in place of another without "interaction error".

Since interfaces may offer operations with the same signatures that have different purposes and semantics, it is useful to have an assertion of compatibility between them. In order to ensure a semantic relationship, the model introduces inheritance. If interface A inherits from interface B, then A offers all of the operations of B, and may also offer some additional operations. The set of operations of A is therefore a superset of the operations of B, and hence A is substitutable for B.

At the heart of CORBA is the Interface Definition Language (IDL). It provides a way of defining the interfaces of objects independently of the programming language in which they are implemented. It is a strongly typed declarative language with a rich set of data types for describing complex parameters. An IDL interface acts as a contract between developers of objects and the eventual users of their interfaces. It also allows the utilization of CORBA objects to compile the interface definitions into hidden code for the transmission of invocation requests across networks and machine architectures without knowledge of the network protocol, the target machine architecture, or even the location of the object being invoked.

IDL definitions inform clients of what operations an object supports, the types of their parameters, and what return types to expect. A client programmer needs only the IDL to write client code that is ready to invoke operations on a remote object. The client utilizes the data type defined in IDL through a language mapping. This mapping defines the programming language constructs (data types, classes, etc.) that will be generated by the IDL compiler supplied by an ORB vendor.

The IDL compiler also generates stub code that the client links to, and this translates, or marshals, the programming language data types into a wire format for transmission as a request message to an object implementation. FIG. 2 depicts the concept of marshaling of data between client 25 and server 28. Client 25 and server 28 exist on opposite sides of the Object Request Broker (ORB) 27. Data from object foo' 26a is communicated/transported across ORB 27 via a process known as marshaling 29, whereby a serialized stream of the data is transmitted. Foo' 26a of client 25 communicates data with similar object type foo 26 of server 28.

IDL and IDL compilers allow programs providing and utilizing object interfaces to agree on the form of their exchanges, even though they may be developed completely independently, in different languages, and on different ORB technologies. This means that objects offering the same interfaces are substitutable, and: that clients can decide which object to utilize at run time with the assurance that there will be no interaction mismatches.

Programs which invoke a CORBA object operation are generally referred to as a client. The client object interacts with a Server, which is a program that makes an object implementation available to a client. Communication between the clients and servers are usually achieved by marshaling of a stream of data across the CORBA network.

The IDL compiler generates a number of java classes known as stub classes for the client and skeleton classes for the server. The role of the stub class is to provide proxy objects that clients can invoke methods on. The proxy object method implementations invoke operations on the object implementations, which may be located remotely. If the object implementation is at a remote location, the proxy object marshals and transmits the invocation request. That is, it takes the operation name and the types and values of its arguments from language-dependent data structures and place them into a linear representation suitable for transmitting across a network. The code to marshal programmer-defined data types is an essential part of the stub code. The resulting marshaled form of the request is sent to the object implementation utilizing the particular ORB's infrastructure. This infrastructure involves a network transport mechanism and additional mechanisms to locate the implementation object, and perhaps to activate the CORBA server program that provides the implementation.

The interfaces to components of the ORB are all specified in IDL. This provides a language-neutral representation of the interface of the ORB. IDL compilers utilize the interface definitions to create the means by which a client can invoke a local function and an invocation then happens, on an object on another machine. The code generated for the client to utilize is known as stub code, and the code generated for the object implementation is called skeleton code.

Java is an example of an object-oriented programming language which utilizes the CORBA standard. Developed by Sun Microsystems, Inc., it provides programming features such as polymorphism, encapsulation, and inheritance. Java programs are compiled into bytecodes, which are similar to machine code but are not specific to any platform. The portability, security, and intrinsic distributed programming support features of the Java programming language make this language useful for Internet programming. Java is a totally object-oriented, platform independent programming language, which achieves architectural independence by compiling source code into its own intermediate representation. Java source code is not compiled into normal machine code, but is translated into code for a virtual machine specifically designed to support Java's features. A Java interpreter or a Java-enabled browser then executes the translated code.

Component software architectures employ discrete software components to quickly prototype and create interactive applications. Applications are built by combining a set of independent components with developer-written code which acts as a "glue" between components, usually responding directly to component events by setting component properties or invoking component methods. One currently popular component software architecture is the Java Bean specification of the Java programming language.

Java Beans provide a component model for building and utilizing Java-based software components. The Java Beans Application Programming Interface (API) makes it possible to write component software in the Java programming language. Components, known as Beans, are self contained, reusable software units that can be visually composed into composite components, applets, applications, and servlets utilizing visual application builder tools. A Bean is usually self-describing, including a file which contains the class' symbol information and method signatures and which may be scanned by a development tool to gather information about the bean, a process referred to as introspection. Any Java class with public methods may be considered a Bean, but a Bean typically has properties and events as well as methods.

Such components can be visually composed into units utilizing visual application builder tools which are utilized only to develop other programs. Components expose their features, (for example, public methods and events) to builder tools for visual manipulation. A Bean's features are exposed because feature names adhere to specific design patterns. A "JavaBeans-enabled" builder tool can then examine the Bean's patterns, discern its features, and expose those features for visual manipulation. A builder tool maintains Beans in a palette or toolbox, and a particular Bean can be selected from the toolbox, dropped into an applet or other component (such as a form), modify its appearance and behavior, define its interaction with other Beans, and compose it and other Beans into an applet, application, or new Bean, all without writing any actual code.

One example of such a tool is a JavaSoft beanbox. Referring to FIG. 3, there is illustrated a beanbox application employing traditional beanbox window functions as developed by Sun Microsystems.

When started, beanbox 30 displays three windows, toolbox 32, beanbox window 34, and properties sheet 36. Toolbox 32 contains the Beans available for utilization by beanbox 30. To work on a Bean, a user/programmer selects it from toolbox 32 and drops it on beanbox window 34. Beanbox window 34 is the area where the user/programmer may visually wire Beans together, defining how Beans appear, and interact with other Beans. Beanbox window 34 is itself an instance of a Beanbox. FIG. 3 shows beanbox window 34 with a juggler Bean instance 38 dropped in it. Beans have to be dropped into beanbox window 34 before they can be manipulated. This requires the user to click on the Bean in toolbox 32 then click within beanbox window 34. The selected Bean instance will appear, and will be selected. After dropping the Bean instance on beanbox window 34, properties sheet 36 displays the Bean properties: color, foreground, background, font, etc. Beans in beanbox 30 can be wired to other Beans which have been dropped in beanbox window 34. Beans are selected in beanbox window 34 by clicking on the Bean. The selected Bean is displayed with a hatched border. The Bean selected has significance for properties sheet 36. Properties sheet 36 displays the properties for the Beans currently selected within beanbox window 34. In FIG. 3, properties sheet 36 displays juggler Bean instance 38 properties. If another Bean is dropped in beanbox window 34, properties sheet 36 will display that Bean's properties.

When beanBox 30 is started, it automatically loads toolbox 32 with all the Beans it finds within the Java Application Resource (JAR) files contained in the Beans/jar directory. A user's JAR files of beans have to be moved into that directory to have them automatically loaded at Beanbox startup. Otherwise, the Beans form the JAR files have to be loaded by utilizing beanbox 30 menu item FileLoadJar.

Builder tools discover a Bean's features (that is its properties, methods, and events) by a process known as introspection. Properties are a Bean's appearance and behavior characteristics that can be changed at design time. Builder tools introspect on a Bean to discover its properties, and expose those properties for manipulation. Beans utilize events to communicate with other Beans. A Bean that wants to receive events (a listener Bean) registers its interest with the Bean that fires the event (a source Bean). Builder tools can examine a Bean and determine which events that Bean can fire (send) and which it can handle (receive). Beans support introspection in two ways: (1) by adhering to specific rules, known as design patterns, when naming Bean features; and (2) by explicitly providing property, method, and event information with a related Bean information class which implements the BeanInfo interface. A BeanInfo class explicitly lists those Bean features that are to be exposed to application builder tools.

A beanbox utilizes either design pattern introspection or a BeanInfo class to discover what events a Bean can fire. JavaBeans provides event-oriented patterns to give introspecting tools the ability to discover what events a Bean can fire.

Lotus BeanMachine is another example of an easy-to-utilize visual authoring tool for manipulating Beans. This platform was designed specifically for web professionals who desire the power of the Java platform without the programming. Designers work from BeanMachine's palette of JavaBean components linking together separate components in a drag-and-drop environment.

Traditional Java Beans and other object-oriented programming models under the CORBA standard are combined by hand to create applications. With the Java Beans, for example, the process utilizes a beanbox as described above and illustrated in FIG. 3. It requires the user to have specific knowledge of Java, JavaBean, the beanbox and the beanbox environment. The Beans can be wired together by hand inside a Beanbox type application such as JavaSoft Bean Development Kit (BDK) beanbox or Lotus BeanMachine. This process can be tedious and labor intensive. A typical wiring session for two simple Beans could entail as many as 25 separate bean wirings (connections). A user is required to understand the events and messages that are applicable, and which objects perform what services. Knowledge of the framework, knowledge of software development, and knowledge of the beanbox environment is also necessary.

It would be desirable, therefore, to have a software application which relieves the user from the burden of learning a beanbox to accomplish Bean wiring, and understanding the framework or other types of software development issues. It would further be advantageous for the user of any CORBA component object architecture to be able to create applications without relying on complete knowledge of the architecture and the labor intensive method of wiring the components together by hand by combining components dynamically, (i.e. in real time) into user applications.

SUMMARY OF THE INVENTION

It is therefore one objective of the present invention to provide an improved method of developing applications for data processing systems.

It is another objective of the present invention to provide such an improved method of developing applications for data processing systems utilizing object-oriented programming components.

It is yet another objective of the present invention to provide such an improved method of developing applications for data processing systems utilizing object-oriented programming language within a distributed object oriented system environment wherein program components are wired dynamically to create client side applications.

The foregoing objectives are achieved as follows. A method is provided for associating program components to create a software application by emitting program components from object data files. Further, the method includes analyzing the program components in real time to identify patterns that conform to pre-defined classes. The program components are dynamically connected utilizing the components' class characteristics to create a software application or routine.

In one illustrative embodiment, Interface Definition Language files are taken from Component Broker object programming and run through QuickTest Emitter wherein Java Bean components are emitted. These Java Bean components are then introspected and classified according to predefined classes based on their characteristics (methods, attributes, etc.). The Java Bean components are then wired in real time utilizing these class characteristics to create a user application.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
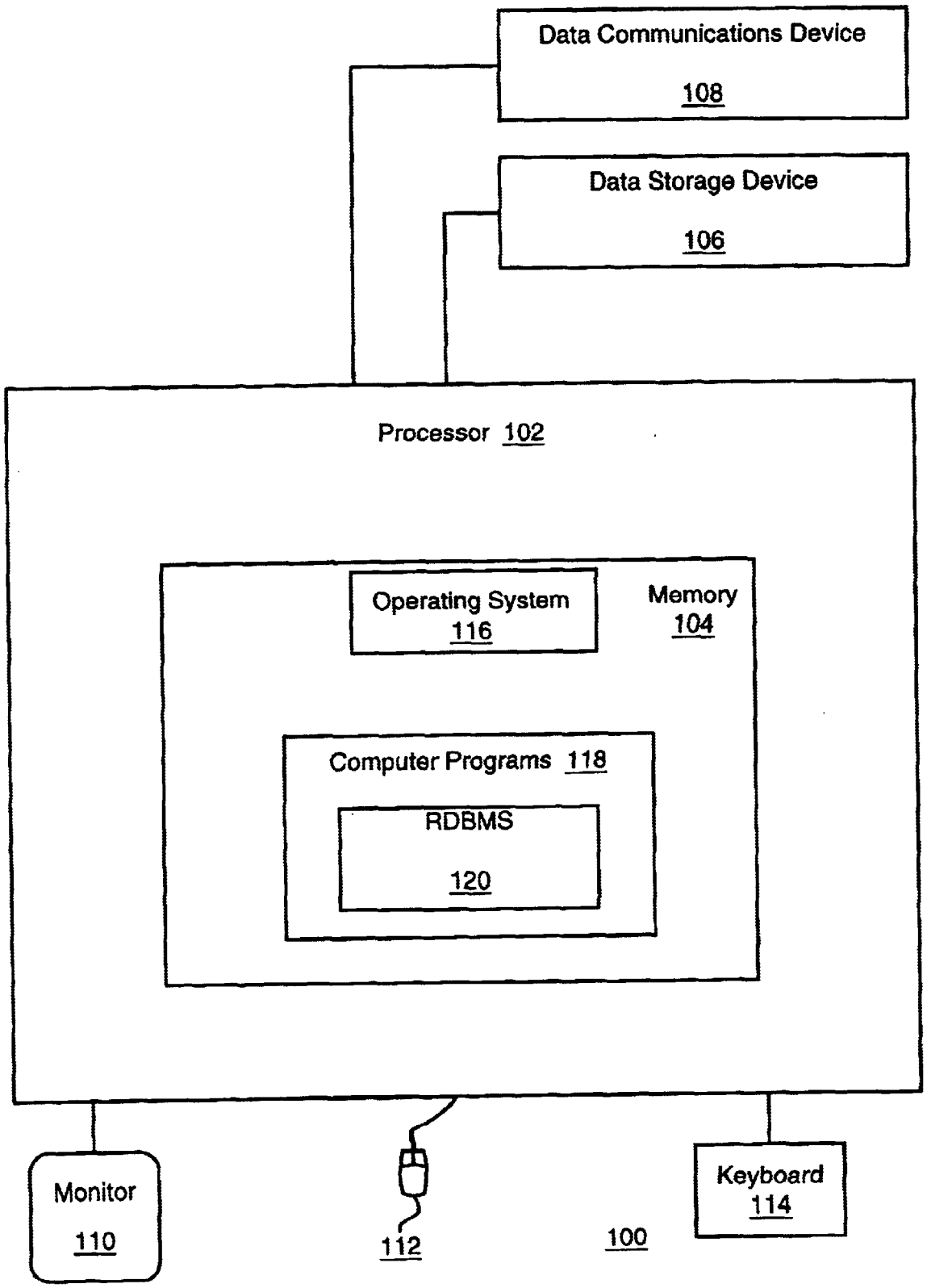
FIG. 1 depicts a block diagram of a data processing system in which a preferred embodiment of the present invention may be implemented.
Figure 2:
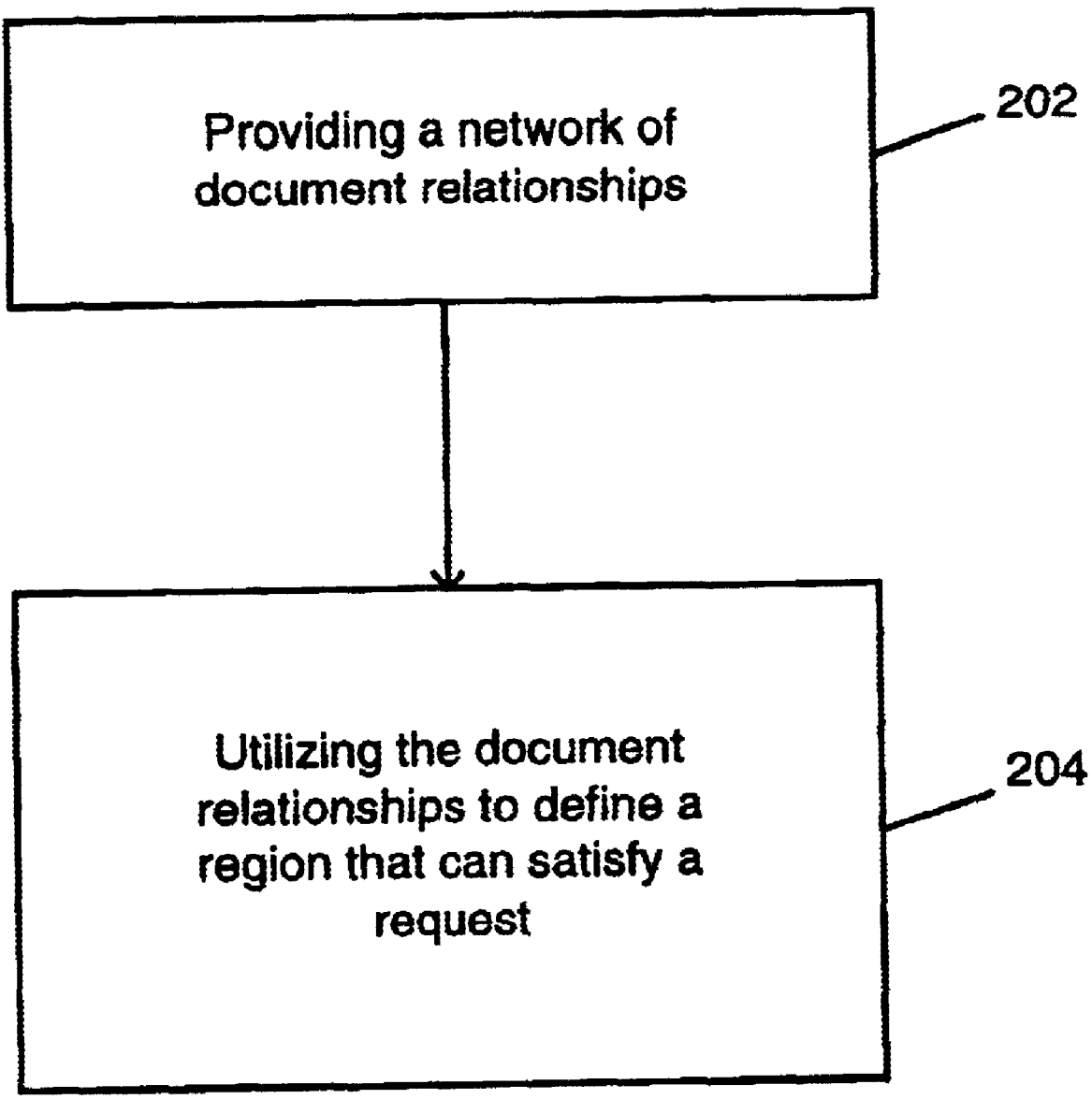
FIG. 2 depicts the marshaling of data from Client to Server side in CORBA programming model.
Figure 3:
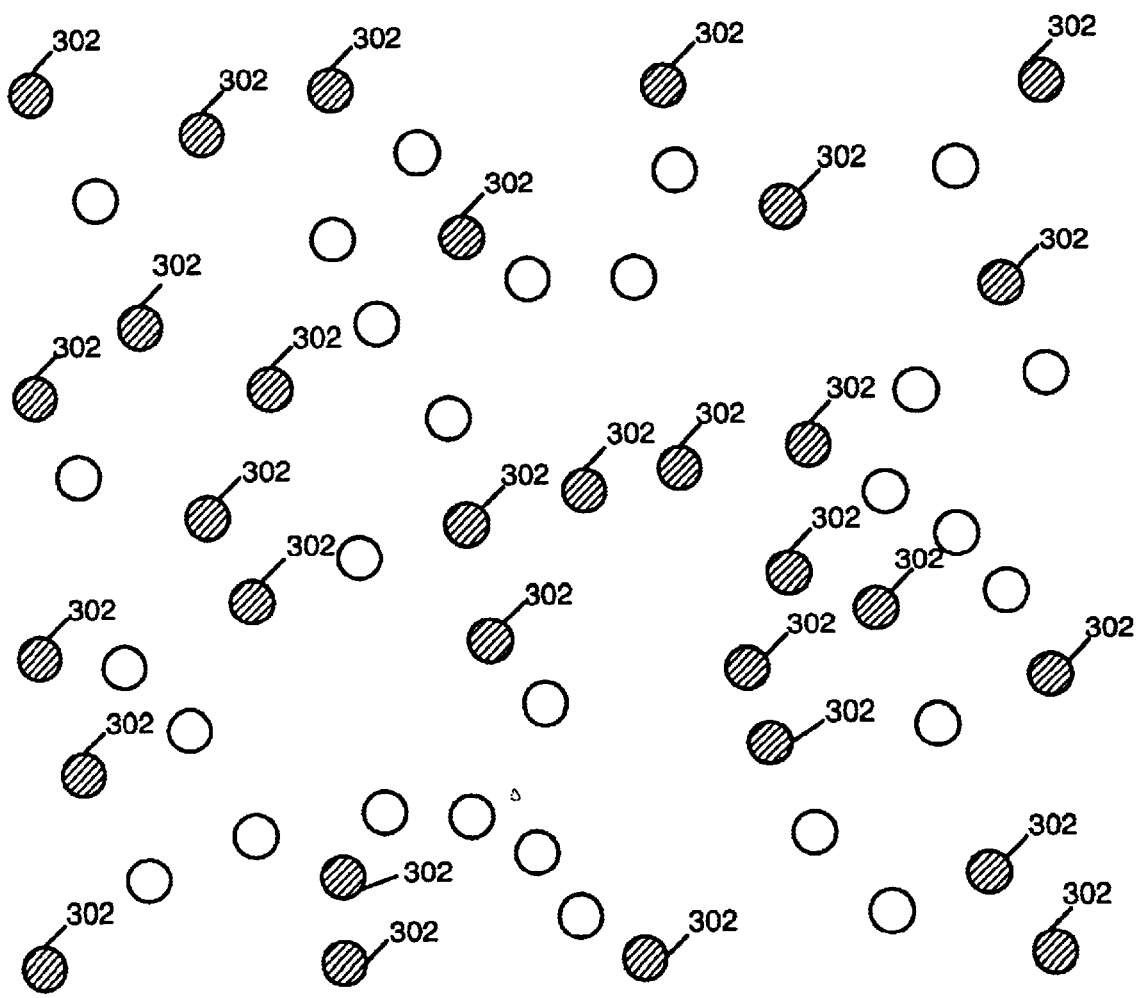
FIG. 3 is a diagram of a Beanbox application in which the wiring of Java Beans is carried out in accordance with the prior art.
Figure 3:

Turning now to the present invention, its various features may be implemented within the "QuickTest" (QT) software application designed by IBM in accordance with the preferred embodiment of the invention. QT consists of QT Emitter and QT Framework that collectively results with specific end user applications which address the particulars of a distributed object oriented system environment such as the CORBA system. QT permits for the creation of a user application utilizing emitted Beans. The created application then allows for thorough and rigorous testing of a particular server application by manipulating items/data in the CORBA system via the user application.

In the preferred embodiment, the invention is practiced utilizing the functionality of CORBA Component Broker (CB), a CORBA-based client side development environment. CB is a full CORBA compliant system which addresses both client and server development. CB consists of various development tools that address the software development life cycle for creation of the CORBA system. One tool in particular is Object Builder which allows for user input of business design and models. OB generates many artifacts which in turn are processed by various processes to produce the resultant application server solution. One such artifact are IDL files which are utilized by the IDL compiler and also by QT. QT application utilizes these IDL files and the data contained therein as the input for creating the user application.

The QT emitter is responsible for processing the CORBA IDL and generating Java GUI code that allow users to interact with the deployed application server. The presentation of information is organized in a general pattern that consistently permits the user to functionally interact completely with the system. The artifacts that are contained within the IDL files consist of:

Attributes—The name and types of the attributes are defined. The names are user provided. The type is a discrete CORBA type such as primitive: string, float, int, double, long, char, byte, boolean, complex: object, sequence, structure, enum, array, etc.

Methods—Methods consist of the following.

Method names—The names are user provided and conform to CORBA naming conventions.

Return types—These are of the same CORBA types that the attributes are. A valid type may be void. The invocation of the method may return a value that represents the results of the method implementation.

Parameter types—Each parameter can be of a type as defined for the attributes above.

Parameter names—The names are user provided and conform to CORBA naming conventions.

Parameter access—One of three CORBA defined names: IN, INOUT, OUT.

Exceptions—When error conditions are encountered, an exception can be thrown that contains the error type and associated description and/or message. During the processing of the method invocation, if an exception is caught by the QT system, the user is presented an Error Window that displays the type and contents of the exception.

Key attribute fields—Which fields of the IDL uniquely identify the object.

In the preferred embodiment, QT processes these IDL input files through an IBM Parser and QT Emitter. IBM IDL to Java Emitter is another IBM component utilized in the process. IBM IDL to Java Emitter emits the stubs (proxy) utilized in the QT application. The IDL files are also processed by the QT Emitter to produce Java Beans that conform to the design patterns of the QT Framework. The QT Emitter leverages the existing IBM Parser technology which is responsible for processing the IDL files and obtaining a in-memory representation of the contained artifacts. After the IBM Parser completes the processing of the IDL files it supports the invocation of sub classes to access the in-memory representation. The QT Emitter thus utilizes this in-memory representation to produce the Java Bean objects. The in-memory representation consists of information such as interface name, parent class, attribute names and types, method names, return values, parameter types and such. The QT Emitter utilizes this information to determine what Java visual representation would support user interaction and interacting with the application server.

These IDL files when processed by the IBM Parser emit proxy objects (stubs) and data utilized by the QT Emitter to emit QT Beans which are visual Java Beans that work with the proxy objects. In object-oriented implementation languages the proxy objects are instantiated as local proxy objects that delegate invocations on their methods to the remote implementation object. When a client wishes to invoke an IDL-defined operation on an object reference as if it were a local method or function call, it must link in proxy objects for the IDL interface which convey that invocation to the target object.

The emitted QT Beans are first generated by the QT Emitter. They are then compiled. Following this, the QT Framework is invoked and during its startup process, performs the introspection of the compiled Beans. The Beans are then wired together to create a client side object which operates in conjunction with a QT Framework to provide a user application. The QT Framework encapsulates complex issues of CB programming. The QT Framework acts as enablement to utilize program model communication between the business objects. The QT Framework inspects the emitted Bean's classes to determine their characteristics. The emitted QT Bean classes only know how to take or store information to and/or from the CORBA proxy object. These emitted Bean classes inherit from QT Framework abstract classes which requires that certain methods be implemented (such as add, change, delete, and display) and utilizes predefined signatures to enable the wiring together to create the application. During implementation, QT looks at the emitted classes and determines its parent class and thus knows how it is connected. It does this by introspection of the emitted code based on the QT Framework parent classes of collaborative Beans and performing operations against CORBA proxy objects without regard to concrete subclasses.

QT Beans emitted during execution of QT conform to QT Framework patterns. The Beans follow a design pattern which permits them to work within the QT Framework. Defined internally in the QT Framework are base classes which represent known characteristics of the Java Bean components. These classes also determines the functions each Bean supports, and which other Beans it can collaborate with.

Utilizing this information, the QT application is able to wire together those Bean components which work together. These wiring of Bean components are utilized within the created user application.

In the event that the Beans do not follow naming conventions, then the user is prompted to provide assistance with the wiring. The prompting displays possible managed objects and associated Key/Copy or in one embodiment of the present invention, the specific wirings of Bean components are represented by GUI visual components made accessible to the user via menu items.

A contract is made by the QT Framework requiring specific implementation and signatures of the classes. They do not know how to complete transactions (add, delete, iterate, etc.) themselves. These transactions when invoked happen on the CORBA proxy object itself. An emitted Bean class thus has to understand only those attributes and methods it contains (names and types).

For each of the attributes, there are GUI components created that support elementary user input validation such as string length, numeric validation, and lists of valid values. Each of the methods defined in the IDL are presented so the user can see each of the return values and all of the parameters. Data entry fields for the parameters also provide fundamental data entry validation. The emitted QT Bean contains logic that retrieves data from the proxy and displays it to the screen for user interaction. The QT Bean also contains the logic to process each the parameters with respect to the type which may be IN, INOUT or OUT. The emitted QT Bean can generate events and listen for specific events as defined by the QT Framework.

The QT Framework knows the CORBA CB Programming Model. It supports the generic operations on a CORBA object such as add, change, delete, find, iterate, and evaluate and controls transaction processing. It does not know nor is it necessary for it to know what concrete type the CORBA object is (Agent, Customer, etc.).

The QT Framework makes all the necessary connections to the CB system. It invokes necessary calls to API to ensure connections via CORBA objects with the CB system. When the Framework processes a proxy object, it works with the emitted Bean classes. Take for example, the retrieval of a collection of proxy objects. The QT Framework only knows they are some type of proxy and it knows there is some identified business object to collaborate with because it is wired for that emitted java class. The proxy is sent to the business object for it to process.

One of the CORBA API methods is to create an Iterator which contains all the objects of a specific type. The QT Framework will invoke the method "createIterator" which returns a collection of proxy objects. The visual representation with QT Framework is to display each attribute of the proxy within a cell in a spreadsheet type interface. The QT Framework does not know what attributes are present within the proxy object. To populate the spreadsheet, the proxy is sent via an event to the specific QT Bean that was "wired" to the QT Framework Tester Bean. The QT Bean accesses the individual attributes and respond in a separate message via an event to the QT Framework Tester Bean. The transmitted event will contain the representation necessary for the spreadsheet to be properly populated. This demonstrates the collaboration between the QT Framework and QT Bean wherein the QT Framework works with abstract proxy objects while the QT Bean works with specific instances where the implementation details are understood. The responsibility of the QT Framework is to provide system level support such as transaction and security processing. The responsibility of the QT Bean is to accept correct user input and transfer data to/from the proxy and GUI screen.

The QT Framework starts the transactions before providing the proxy to the business object. When the business object is done with the proxy, it returns a message informing the QT Framework it is complete. The QT Framework completes the transaction. The QT Framework only knows what type of transaction, session, or transient activity is taking place.

Another example would be a request to add an object utilizing the Add by Key option. Each CORBA object has an Interface IDL and a Key IDL. The Key IDL identifies which attributes of the Interface IDL uniquely identify an instance of the CORBA object. There is no information within the Interface IDL that indicates which of the attributes make up this unique key. To create a unique CORBA object, the user must provide the Key attributes with values that are unique within the application server. The QT Emitter processes the Interface IDL separately from the Key IDL. Each IDL is processed individually. Take for example, a class "FOO."

There will be a FOO.IDL and a FOOKEY.IDL file. When these are processed by the QT Emitter, there are two emitted QT Beans, FOOBean and FOOKeyBean. These two beans are wired together and the FOOBean is wired to the QT Framework Tester Bean.

The FOOBean contains the GUI which the user interacts with. When the user populates the data entry fields in the GUI and then requests that the CORBA object be created utilizing the Add by Key method, an event is sent to the QT Framework Tester Bean. The QT Framework Tester Bean starts a transaction and sends a message back to FOOBean indicating that processing can safely continue. FOOBean then messages FOOKeyBean and provides access to the data the user has entered on the screen. FOOKeyBean knows which subset of the user entered data is applicable for the creation of a Key. The Key is created by FOOKeyBean with only those attributes required and a generic CORBA byte string is generated and sent back to FOOBean. FOOBean then forwards this byte string to the Tester Bean. The Tester Bean is then able to perform the actual createFromPrimaryKeyString with this the parameter containing the byte string. When this call is completed, the Tester Bean completes the transaction and the control is returned to FOOBean.

During this process, the Tester Bean never knows the exact object being worked with, FOOBean does not know what attributes make up the Key, and FOOKeyBean does not know what other attributes belong to FOOBean other then those that make up the Key. Also to note, although this example states that a transaction was created, this could have been some other action controlled by the Tester Bean while FOOBean was completely ignorant of the action.

When the business object wants to initiate some method invocation, it sends a message to the QT Framework informing the QT Framework of its intent. The QT Framework again performs the appropriate activity begin (transaction, session, etc.) and messages the business object that everything is ready. The business object then performs its work and completes by informing the QT Framework to complete the transaction.

During all this processing the QT Framework has been responsible for establishing and maintaining all the communications, error checking, and implementation of the programming model issues. This greatly relieves the burden of business object development for the client side.

Figure 4:
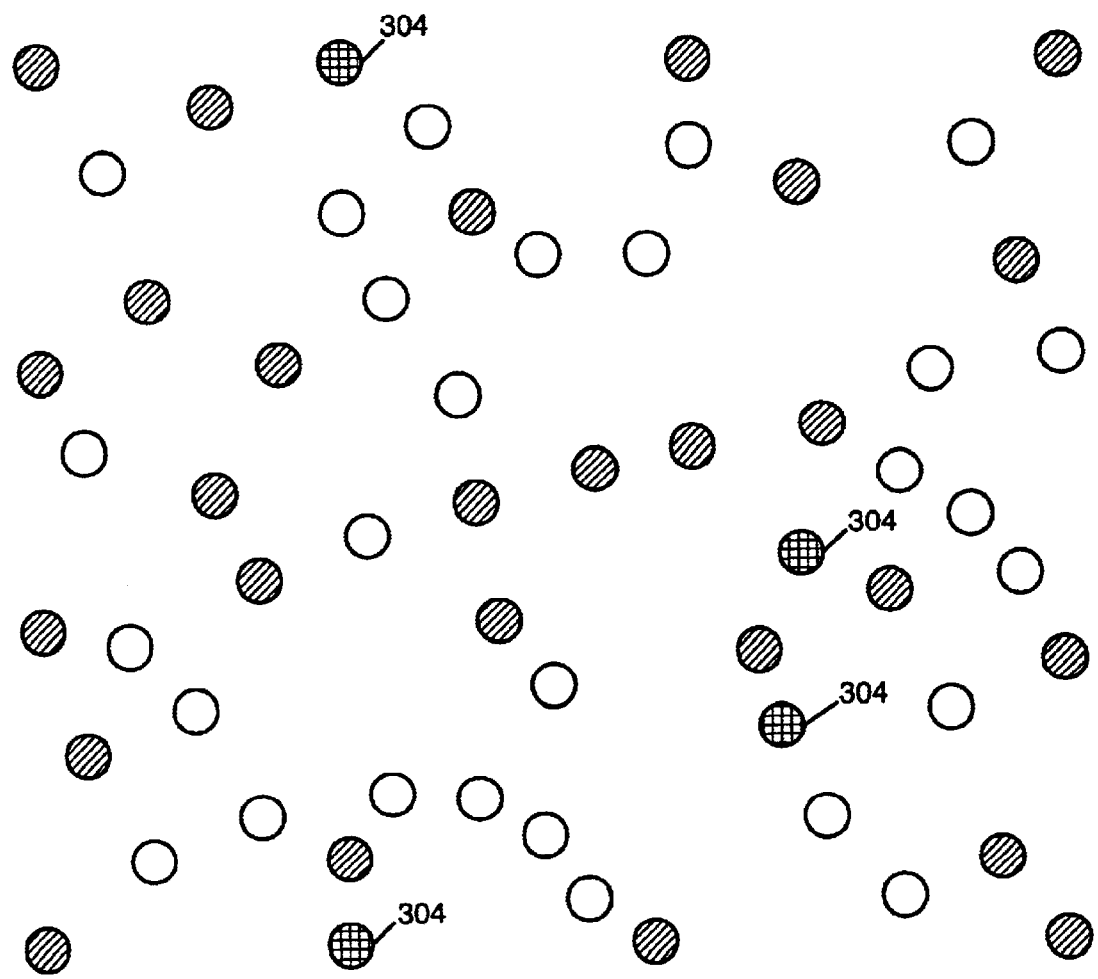
FIG. 4 is a high level block diagram representation of the workings within the QuickTest environment utilizing CORBA components and IDL file.

With reference now to FIG. 4, there is depicted a high level block diagram of one embodiment of the present invention. The invention encompasses several distinct features as described above each of which is illustrated in one or more of the blocks of FIG. 4, and further illustrated in the additional figures and as described below. The blocks are primarily software blocks which perform the various functions/tasks on the program objects/components within the QuickTest application and CORBA environment.

In the illustration of FIG. 4, there is depicted the various elements in the development of a user application according to the preferred embodiment of the invention. CB Object Builder (OB) 40 provides an IDL file foo.IDL 202 which consists of data 202a. Information from IDL files is utilized to identify an object's attributes and methods within the server.

The present invention involves the utilization of the processes found on the lower limb of the FIG. 4 diagram. Foo.IDL 202 is processed by IBM Parser 208 to produce standard CORBA proxy objects 51. In this embodiment, IBM Parser 208 generates C++ programs. In this embodiment, CORBA proxy objects 51 are represented with Java code 212a of the original foo.IDL 202. It is possible to represent them utilizing C++, Cobol, visual basic, or other programming language. These Java code 212a are instrumental in/the communication between the client side of the environment and CORBA system as will be discussed later.

The invention extends IBM Parser 208 technology to permit foo.IDL 202 to be processed through QT Emitter 52 and emit QT Beans 53 which are visual GUI representations of the specific data within foo.IDL 202. This process is completed as follows. When running foo.IDL 202 through IBM Parser 208, proxy objects are created which work with CORBA environment. Additionally, this process creates a "dictionary" comprising of the subclassed components (attributes, methods, etc.) of foo.IDL 202. QT Emitter 52 accesses this "dictionary" and creates a graphical representation of the subclassed components based on a predefined form layout. These graphical representations are visual Java beans, QT beans 53, which provide the user interface for the application being created. QT Beans 53 operate on the client side of the CORBA environment. They work in conjunction with CORBA proxy objects 51 to communicate data to CB Programming Model 215. CB Programming Model 215 interacts with QT Framework 50 during running of the application. User 217 interacts with the created application via the QT Beans which are represented to user 217 as GUI objects.

Figure 5:
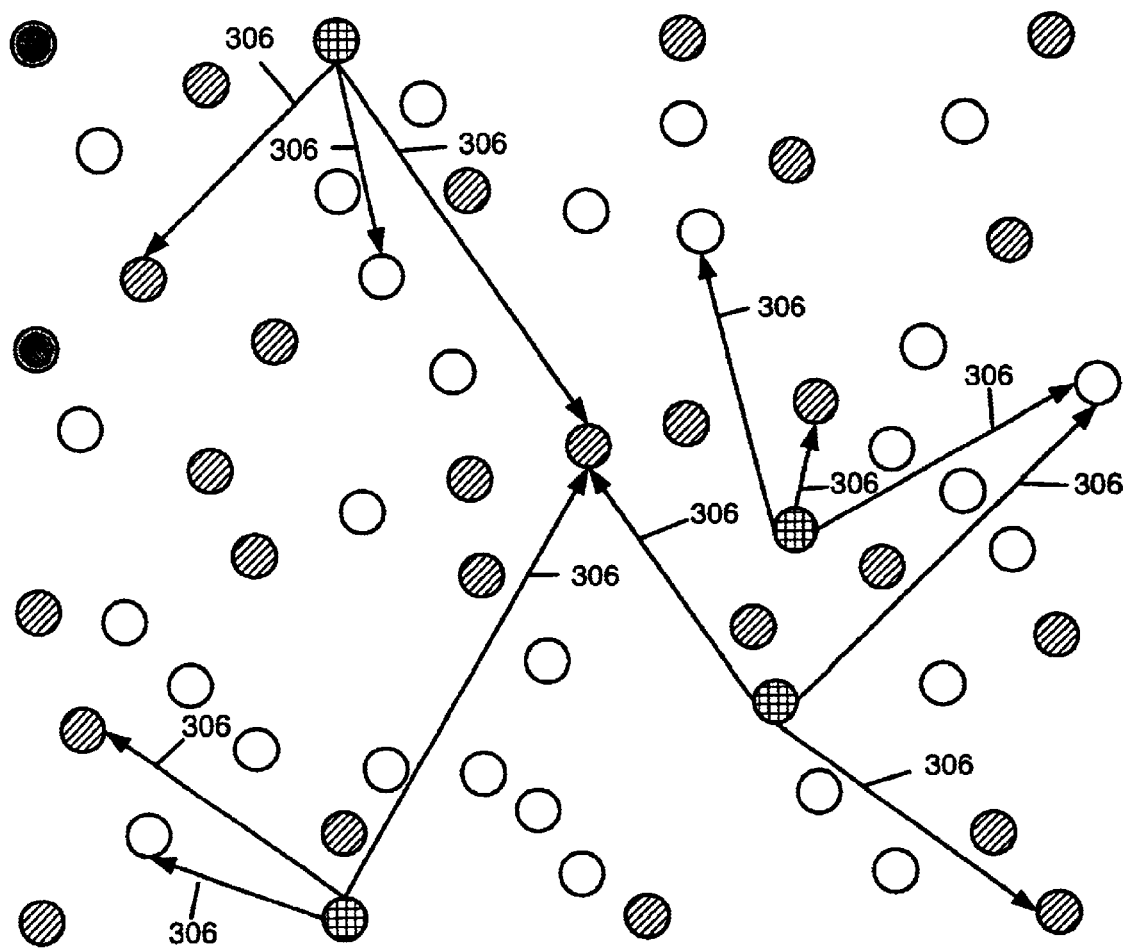
FIG. 5 is a high level block diagram illustrating the operation of the invention with a Component Broker programming model according to the preferred embodiment of the present invention.
Figure 5:
Figure 5:

FIG. 5 depicts one method of developing an application according to the present invention utilizing the QuickTest Emitter which works in conjunction with the QT Framework. In this illustration, CB Object Builder (OB) 40 provides IDL files 44, which are processed in QT Emitter 52 as described above resulting with emitted QT beans 53.

CB 40 emits business logic code 41 which is compiled, built and installed 42 on the data processing system. Once installed, its execution creates a server application 46 which is accessed via QT Framework 50. Server application 46 has access to data which may be available in database 48 according to this embodiment. Note that the data could be transient, persistent, or even exist on another remote system. The objects are read/write able and supports updating of information during execution of the created application. Server application 46 supports the CB Programming Model. QT Framework 50 communicates with CORBA proxy objects 51 on the client side of the CB programming model. The CORBA proxy objects on client side are thus able to interact with the CORBA server objects when executed by the QT application. The CORBA proxy objects perform marshaling to achieve data transfer across the channels. QT only tells the object to perform functions, etc. QT Beans 53 access the emitted Java objects 54 created utilizing IDL files 44 which were processed through QT Emitter 52 as described above. In the preferred embodiment, these QT Beans serve as business objects which may be manipulated within the CB programming model. A user of CB 56 only interacts with the visual representations of the emitted QT Beans 53. All the wiring of component parts and the transferring of data from client side to server side take place within the QT Framework/CB Programming model.

Figure 6:
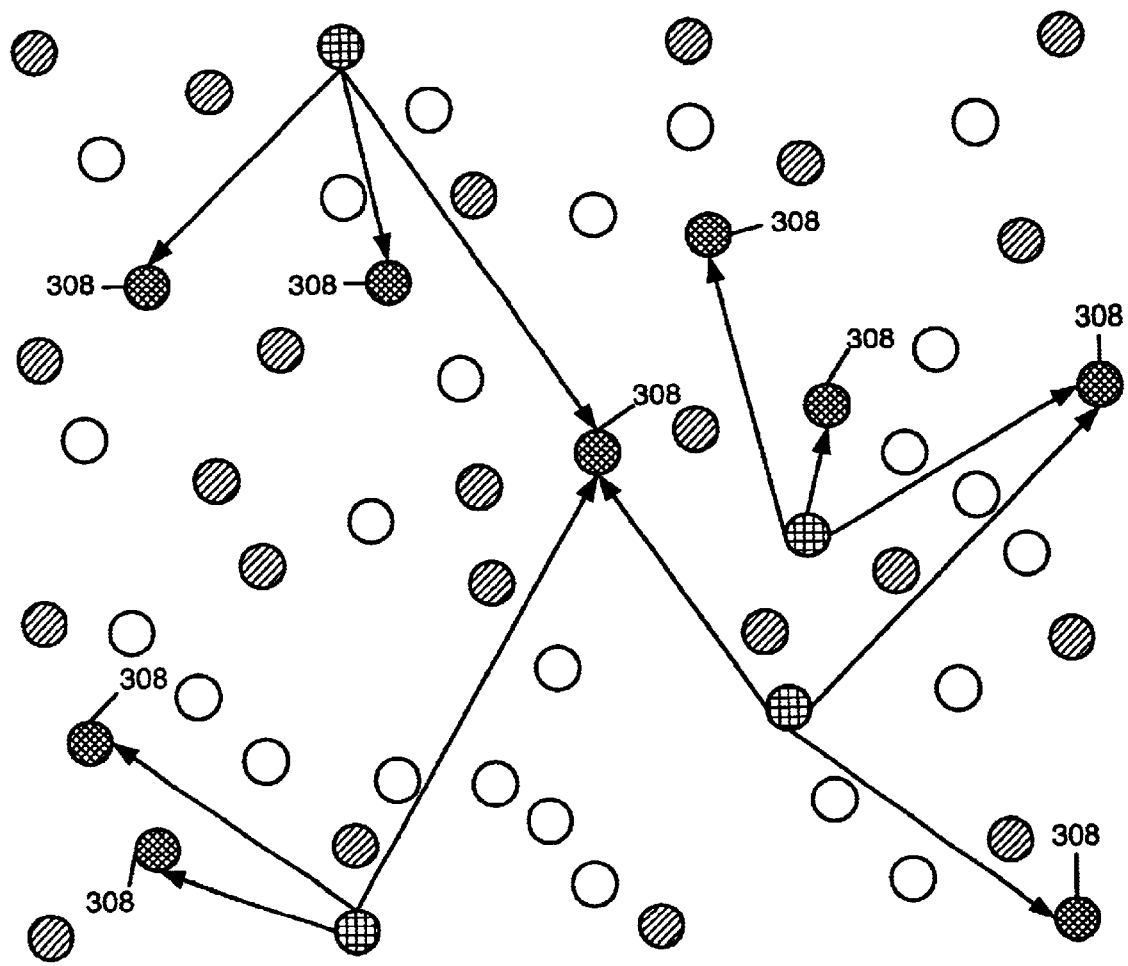
FIGS. 6 is a block diagram illustrating the QuickTest Emitter with the generalized abstract classes of Beans available in the QT Framework according to one embodiment of the present invention.

The illustration of FIG. 6 depicts QT Emitter 52 and the general classes of Beans utilized by the QT Framework. QT emitter 52 operates on IDL files 44 and processes them to emit subclasses of the abstract bean classes depicted. In this illustration, the abstract classes of the QT Framework are defined as TestBean 77, TestHomeBean 78, KeyBean 79 and CopyBean 80. These abstract classes of Beans are the components utilized to create the application to run in conjunction with the QT Framework. FIG. 6 illustrates only four subclasses according to one embodiment of the invention; however additional, (or fewer) subclasses are possible.

Figure 7:
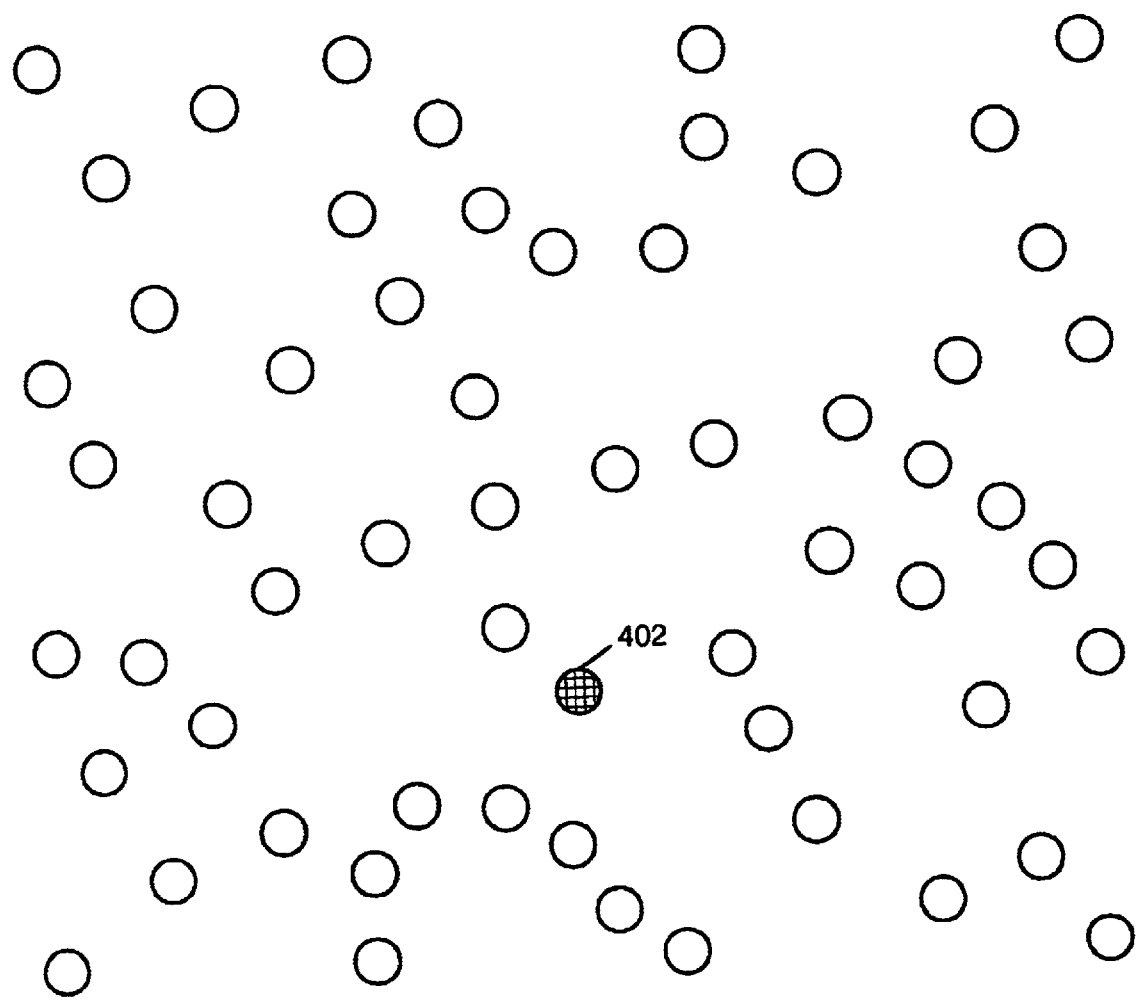
FIG. 7 is a block diagram depicting the emitted subclassed beans which have been dynamically wired to create an application in accordance with one embodiment of the present invention.
Figure 7:

FIG. 7 depicts one illustration of the wiring of the subclasses of Beans, (QT beans) extended from the classes of Beans of FIG. 6 after being processed in and emitted from the QT Emitter. QT beans create a visual representation of the CORBA proxy to support get/set of attributes and invocation of methods.

Returning now to FIG. 7, a network is illustrated in which the Bean subclasses have been dynamically wired together based on their particular class and name patterns. Note that these subclasses fooTestHomeBean 78*a*, fooTestBean 77*a*, fooKeyBean 79*a*, and fooCopyBean 80*a* correspond to the specific abstract classes namely,. fooHome.IDL, fooKey.IDL, fooCopy.IDL and foo.IDL. Although the bean wirings depicted are one to one, it is possible to have other types of wiring in different embodiments of the invention.

The wiring is completed in real time based on specific elements supported by the Bean pairs. FooTestBean 77*a* represents the main Bean while the other subclass Beans are functional components of it and are wired to it. In this illustrated embodiment, the wiring to fooTestHomeBean 78*a* supports transactions 81*a*. Wiring to fooKeyBean 79*a* supports add by key & find 81*c*. Finally, wiring to fooCopyBean 80*a* supports add by copy 81*d*. This wired network of subclass Beans fooTestBean 77*a* in turn supports CB Programming Model operations and transaction processing method invocations 81*b*. It communicates with the QT Framework via the QT Framework bean called Tester Bean 82 which does all the primary CORBA programming calls of the QT Framework and supports system processing. Tester Bean 82 is wired to fooTestBean 77*a* or a subclass of fooTestBean 77*a*. It supports the majority of CORBA programming calls. The intricate network of wirings of these Beans and communication links allows for the implementation of user applications under CB Programming Model.

Once the identification/classification of the Beans is accomplished, the wiring together of the various components is required. This wiring process consists of identifying the components to each other by registering as listeners. A listener object supports a specific interface. This interface will be invoked when a specific activity occurs for which the listener wishes to be notified. For example, the TestBean and Tester Bean are wired to support multiple types of discreet activities. The communication is bi-directional. The QuickTest application takes the specific instance of the emitted TestBean and invokes the Tester Bean addTesterListener method. The parameter to this method is an object of type TesterListener which supports the method "testerEvents" to which the parameter TesterEvent is required. When Tester Bean detects a user initiated action such as Update or Display, a TesterEvent object is created within Tester Bean and initialized with the value the signifies what action occurred, then Tester Bean invokes the "testerEvents" method on the subclass of TestBean. When the subclassed TestBean object receives the TesterEvent object in the parameter of the "testerEvents" method, the object is interrogated to determine what action needs to be supported. At this time, the base class TestBean calls to the derived subclass to invoke the appropriate and required method implemented by the emitted subclass. Once the necessary action has been accomplished and similar process occurs but with the subclassed TestBean initiating the call to the now listener Tester Bean object. The message sent to the Tester Bean object will contain the necessary data that satisfies the primary request from Tester. The conclusion of the entire operation is completed when each of the calls are returned.

Figure 8:
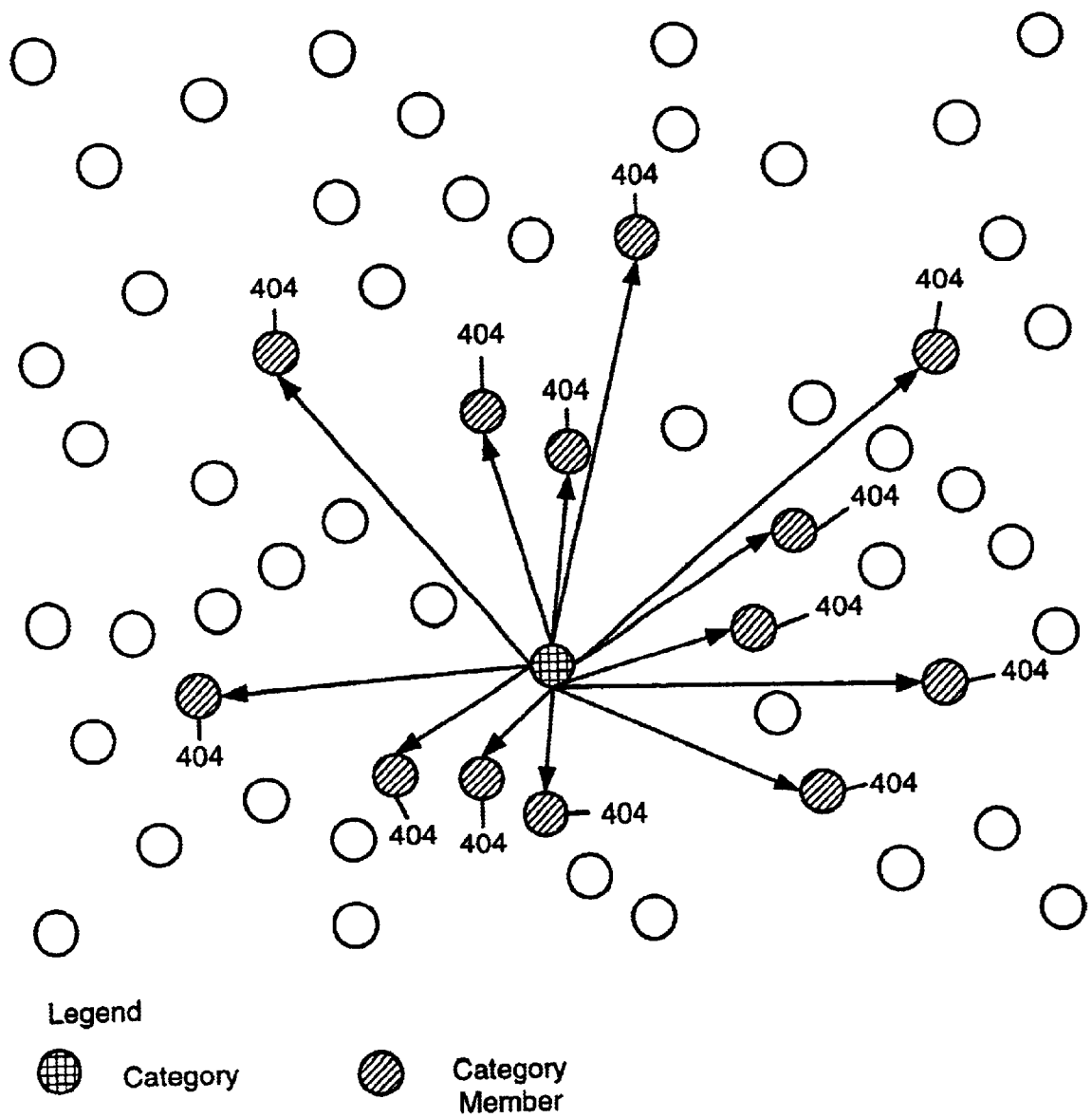
FIG. 8 is a picture representation of one of several graphical user interfaces (GUIs) created when the invention is implemented utilizing QuickTest and Component Broker software applications in accordance with one implementation of the preferred embodiment of the present invention.

Another feature of the invention is illustrated in FIG. 8 in accordance with one embodiment of the invention. FIG. 8 depicts one layout of a client side GUI created from emitted QT Beans utilizing the QT application and CB object programming models according to one embodiment of the invention. In the preferred embodiment, the GUI consists of 4 sections as is illustrated in FIG. 8. The two main sections have toolbars with buttons that support the operations that are pertinent. On the left hand side, individual objects are maintained. Thus, the toolbar on the left contains operations that operate against the currently selected object. When an object is currently selected, CORBA proxy object 51 changes color. On the right hand side, the toolbar contains operations that work on collections of objects. Each of these areas are separated by scrollable panes so that the user can resize them.

The GUI screen comprises of an iterator 88 working in conjunction with multiple CORBA proxy objects 51. Iterator 88 represents things of the same-type. Selection of one item from the list of iterator 88 results in the visual representation of the selected items related data on the client side. Items displayed on the right hand side of FIG. 8 represent buttons which call the proxy and are general in nature. Those items on the left hand side are methods, attributes, etc. specific to a particular object.

A collection of CORBA objects of similar type labelled data view rows 94 is depicted. These rows are individual representations of CORBA objects utilized by the client side of the screen. Above data view rows 94 are buttons which when selected invoke a general function within the QT Framework which allows for manipulation of CORBA proxy object 51. In the illustration of FIG. 8 these buttons include Iterate 97*a*, Delete All 97*b*, and Add All to Ref Col 97*c*. It is understood that the menu items are not limited to those depicted here—other illustrations would include a different array of menu buttons representing the general functions of the QT Framework.

Instances of CORBA proxy objects 51 are modified by the emitted TestBean. The name of attribute 90 of the IDL file are provided as the label for data entry field 92. Each attribute has a corresponding data entry field 92. Data entry field 92 may be of any type, i.e. a simple text field or any other field type. Data entry fields 92 for the primitive data types provide data validation upon entry dependant upon the type of attribute. For example, a string may be defined to be constrained to a specific size. Data entry field 92 will limit the data entered to be less than or equal the defined size. Likewise, for numeric data, only valid numerical digits are allowed into the field and the values are required to be limited by the capacity of the data type.

A new object type called copypaste has been included in the pop up menu of all fields, return values and parameter values. The copypaste field supports the processing of CORBA object types in a novel way. It provides the user the ability to copy and paste data from one object to another in the CB environment. The copypaste object supports the data transfer within the CORBA objects that can be utilized as attributes, method parameters and method return types.

Below the two parallel columns of attribute 90 and data entry field 92 are methods (functions) 98. Each method 98 is represented by a button with the name of method 98 printed on the button. Pressing of the buttons signifies the invocation of method 98. Method 98 can only be executed when a selected object is present. The buttons are enabled when the object is selected. Next to method 98 is its parameter, return field 100. The method parameters are utilized for input or output. Return field 100 may be primitive or complex types or of object type and also utilizes the copypaste functionality. The complex datatypes can be maintained utilizing the copypaste functionality. For example, if an attribute is a OUT parameter of type FooStructure, at the successful completion of the method invocation the parameter will contain an object of type FooStructure. This object can be copypasted to the Test Case Window that supports the display/editing of this FooStructure, namely the __FooStructureBean window. The primitive types display within return value field 99 while the complex types are copypasted to the window that supports it.

Below each method 98 are parameters 102, if any, that method 98 takes. These are laid out in the manner that the attribute labels fields are on the left and return value field 99 are in parallel on the right.

The title of CORBA proxy objects 51 is the name of the CORBA object being processed. The copypaste object allows the user to copy the object for the proxy (the heading) to any parameter/attribute that is of that type in the CORBA proxy objects 51.

Iterator 88 contains a collection of proxy objects and works within QT Framework. It will also accept copypaste objects from the proxy display. For example, a return object of type "iterator" can be copypasted to the iterator for that type of copypaste object in the QT Framework. The result of this operation is that the associated list is repopulated with the data contained by this iterator.

The copypaste functionality is key to the utilization of the proxy in transferring data from the CORBA object to the QT Framework. In the illustrated embodiment, the availability of an object for copy is signalled by the copypaste object providing a visual indication of a valid object available such as changing its appearance (color) and by appending an asterisk to the display name. The display name is the name of the object that the copypaste object has a reference to. In the QT application, this functionality of selecting to copy or paste is initiated by clicking the right mouse button. When the button is clicked, a menu pops up in which the copy and paste options will be enabled if either function is available for the given object.

On the right, the table displays objects that are of the type that was defined within the IDL. The table is populated when an Add by Key 96a or Add by Copy 96b or Find 96c function is exercised by selecting their respective buttons. Additionally, if the Home that contains these objects is Queryable, Iterate 97a can be utilized.

The left hand side has three areas. On the extreme left, there is a column containing an Object Oriented Structures Query Language (OOSQL) Predicate drop down list box (DDLB) 89 in parallel with attributes 90. Each attribute 90 that represents an attribute primitive object type has the OOSQL Predicate DDLB. Complex attribute types are not supported with the OOSQL Predicate DDLB.

OOSQL Predicate DDLB Object Oriented Predicate Descriptor (OOPD) contains selection criteria predicates from the following set:

<—Less than
>—Greater than
<=—Less than or equal to
>=—Greater than or equal to
=—Equal to
<>—Not equal to
like—A value similar—Uses the "%" as replacement character.

The OOPD and iterate 97a work together in the following fashion. When iterate 97a is pressed, each of the attributes are checked to determine if there is a value in data entry field 92. If there is a value then the OOPD is checked to determine if there is a selection other then the default selection of nothing. If there is a selection of the OOPD and there is data in data entry field 92, a OOSQL statement is generated of the form "attribute-name predicate-value attribute-value". If there are multiple OOPD/attribute value pairs, the statements are "and"ed together to form one complete selection clause. This clause is then utilized in the "evaluate" statement against the home. This functionality provides the ability to select limited sets of data. If there are no OOPD selections, then the "iterate" method is utilized against the home which in effect returns all the objects contained in the home with no restrictions.

There are two CORBA objects that are on each screen which support the copypaste functions. The first is CORBA proxy object 51 on the left. This object provides visual indication of a CORBA proxy for the server business object. In accordance with one embodiment of the invention, CORBA proxy object 51 is color coded. When presented as the color of Pink, there is currently no object present. The color of "Cyan" signifies that an object is present. To be present means that the object can respond to actions that manipulate the state or invoke methods which provide behavior. CORBA proxy object 51 can support the copypaste functionality of QT. When CORBA proxy object 51 is pasted into, the attributes which are contained are extracted and displayed in the data entry fields. CORBA proxy object 51 might be pasted into, for example, when the return value of a method is of that specific type. To be more specific, if the return value of a method is of type Foo, then the Foo Proxy label on the Foo Test Case Window can be pasted into. Likewise, CORBA proxy object 51 can have the Copy functionality performed if there is an existing valid Proxy object contained within.

The second object is Iterator 88 on the right. This object behaves and responds in a similar manner as does CORBA proxy object 51 except that it will only successfully process iterators that contains homogenous objects of the Test Case Window type. When Iterator 88 is pasted into, for each element within the collection, the proxy object is sent to the proxy Bean to extract the attributes with the result provided to the Test Table for display. The Test Table displays the contents of the collection of object contained by Iterator 88.

This invention thus formalizes the presentation of information in a systematic fashion enabling complete interaction with the application business object. The user has a consistent metaphor from which to manipulate the objects which represent the business entities.

Figure 9:
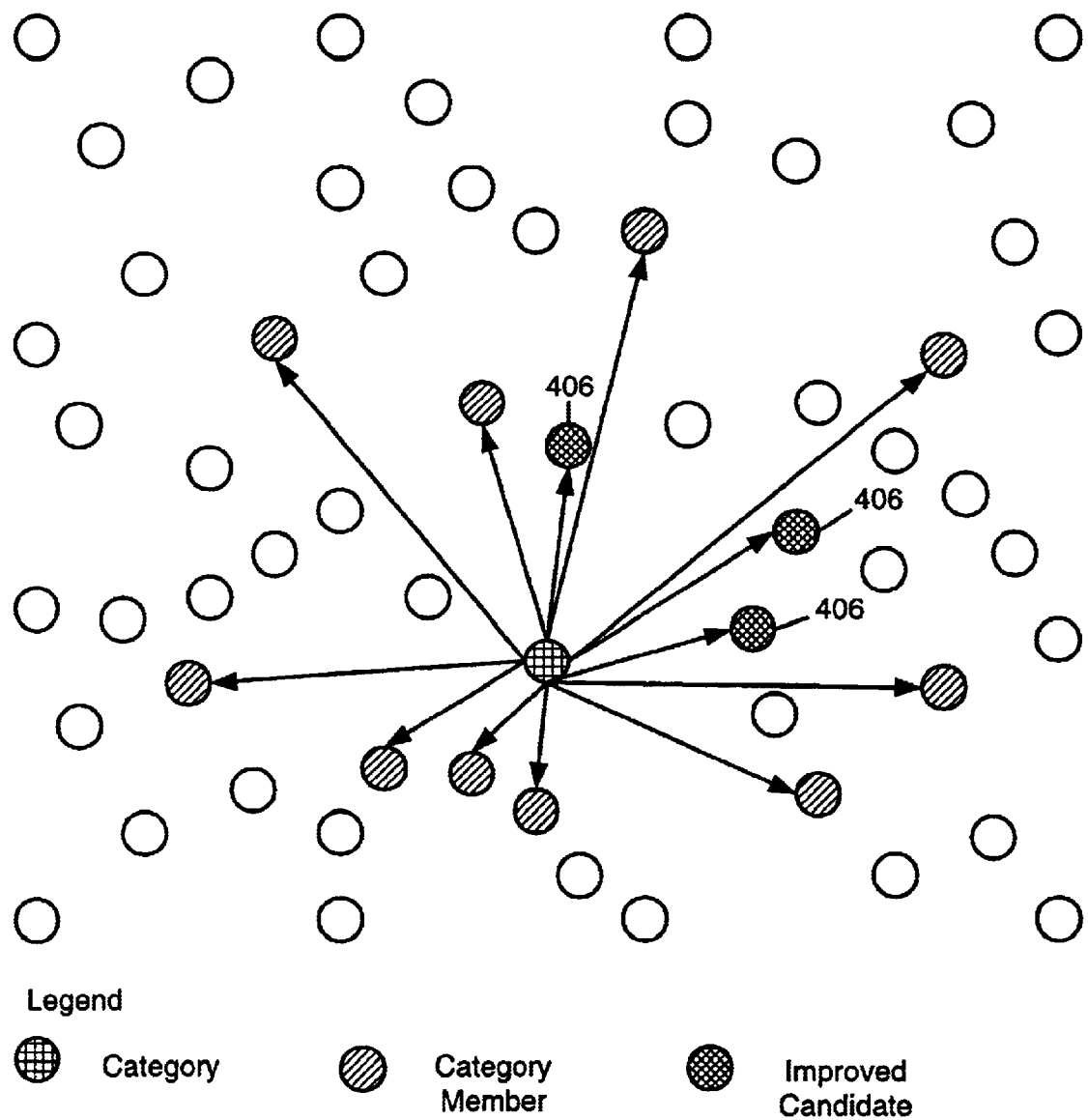
FIG. 9 is a block diagram illustrating QT processing on the various parameters during program execution according to one embodiment of the present invention.

FIG. 9 is an illustration of operation of the functional aspects of QT on CORBA data types utilizing editing and copypaste functionality according to one embodiment of the present invention. An IDL file from object builder 110 consists of general types of data such as numeric strings 111, enumeration 112, boolean 113, and object reference 114. The various data types when sent through QT emitter 52 are transposed into subclasses which work within QT Framework. In this illustration, these subclasses include QTTextfield 116, QTenum 117, QTBool 118 and CopyPaste 119 which are featured as visual representations of data. The visual representation allows for efficient editing of data by the user. Each data types has a corresponding editor function QTTextEditor 120, QTenumEditor 121, QTBoolEditor 122, and CopypasteEditor 123, respectively. Each editor supports a pop up and/or pull down menu 125 which supports text editing, data entry and copy and paste options. The editor's pop up menu 125 are utilized to transfer data to and from the QT Framework via a clipboard (proxy) 124. The paste option takes data from clipboard 124 and updates the respective subclass. The copy option takes data from the subclass and places it on clipboard 124 for manipulation by the QT Framework. These visual components appear throughout QT allowing the user to completely interact with and transfer all data.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention. For example while the source of the IDL files utilize was described as being the Component Broker application, it is understood that any IDL file or file with features/functionality of an IDL files may be utilized in the invention. Also, although the preferred embodiment is implemented utilizing Java based object oriented programming, it is understood that CORBA is language independent and thus other types of object oriented programming language with similar functionalities such as SmallTalk or Visual Basic may be utilized in place of Java.

What is claimed is:

1. A processor-executed method of combining program components on a data processing system to create a software routine, comprising the steps of:

analyzing code in real time to identify patterns that conform to pre-defined classes, wherein said code is associated with a plurality of program components residing on a storage device of the data processing system;

dynamically associating the program components and wiring said components based on the patterns identified in said code to create a software routine that includes a graphical user interface for user manipulation during execution;

representing each wiring of program components with a user interface in the created software routine, wherein each wiring has an associated functionality and manipulation and manipulation of a feature within said user interface during execution of said software routine activates said functionality associated with said wiring; and storing said software routine on said storage device of the data processing system.

2. The method of claim 1, further comprising the steps of:

emitting object-oriented program components utilizing standard object data files;

compiling said object-oriented program components to create code; and creating said user interface for a user application utilizing said compiled object-oriented program components.

3. The method of claim 1, wherein said program components of said analyzing step are object-oriented program components and said analyzing step further include the steps of:

introspecting said program components wherein behavior patterns of said object-oriented program components are determined;

comparing said behavior patterns with known patterns of predetermined general classes of a framework; and connecting said object-oriented program components together based on said behavior patterns and connection patterns of said general classes.

4. The method of claim 2, wherein said emitting step and associating step are instantiated within an object oriented programming environment and wherein said object oriented programming environment includes Common Object Request Broker Architecture component broker environment.

5. The method of claim 2, wherein said object-oriented program components generated in said emitting step include Java Bean components.

6. The method of claim 2, wherein said object data files utilized in the emitting step include interface definition language (IDL) files from a component broker environment.

7. The method of claim 1, wherein said pre-defined class patterns include attributes, methods, and parameters of said program components.

8. The method of claim 2, wherein said software routine created by said emitting step, introspecting step, and wiring step is executed within a Common Object Request Broker Architecture (CORBA) environment comprising of a framework, proxy objects, and CORBA objects.

9. The method of claim 8, further comprising the step of enabling said framework to communicate with said CORBA objects via said proxy objects providing user manipulation of data during execution of said software routine.

10. A system implemented within a data processing system for combining program components to create a software application, said system comprising:

means for analyzing code in real time to identify patterns that conform to pre-defined classes, wherein said code is associated with a plurality of program components residing on a storage device of the data processing system;

means for dynamically associating the program components and wiring said components based on the patterns identified in said code to create a software routine that includes a user interface for user manipulation during execution;

means for representing each wiring of program components with a user interface in the created software routine, wherein each wiring has an associated functionality and manipulation of a feature within said user interface during execution of said software routine activates said functionality associated with said wiring; and means for storing said software routine on said storage device of the data processing system.

11. The system of claim 10, comprising further:

means for emitting object-oriented program components utilizing standard data object files; and means for compiling said object-oriented program components to create code.

12. The system of claim 10, wherein said program components of said analyzing means are object-oriented program components and said analyzing means further include:

means for introspecting said program components wherein behavior patterns of said object-oriented program components are determined;

means for comparing said behavior patterns with known patterns of predetermined general classes of a framework; and means for connecting said object-oriented program components together based on said behavior patterns and connection patterns of said general classes.

13. The system of claim 11, wherein said emitting means and associating means are instantiated within an object oriented programming environment and wherein said object oriented programming environment includes Common Object Request Broker Architecture component broker environment.

14. The system of claim 11, wherein said object-oriented program components generated in said emitting means include Java Bean components.

15. The system of claim 11, wherein said object data files utilized in the emitting means include interface definition language (IDL) files from a component broker environment.

16. The system of claim 10, wherein said pre-defined class patterns include attributes, methods, and parameters of said program components.

17. The system of claim 11, wherein said software routine created by said emitting means, introspecting means, and wiring means is executed within a Common Object Request Broker Architecture (CORBA) environment comprising of a framework, proxy, objects, and CORBA objects.

18. The system of claim 17, further comprising means for enabling said framework to communicate with said CORBA objects via said proxy objects providing user manipulation of data during execution of said software routine.

19. A computer program product for combining program components on a data processing system to create a software routine, comprising program instructions in a computer readable medium for:

analyzing code in real time to identify patterns that conform to pre-defined classes, wherein said code is associated with a plurality of program components residing on a storage device of the data processing system;

dynamically associating the program components utilizing said processor to wire said components based on the patterns identified in said code to create a software routine;

representing each wiring of program components with a graphical user interface in the created software routine, wherein each wiring has an associated functionality and manipulation of particular features of said graphical user interface during execution of said software routine activates said functionality associated with said wiring; and storing said software routine on said storage device of the data processing system.

20. The computer program product of claim 19, further comprising of program instructions for:

emitting object-oriented program components utilizing standard data object files; and compiling said object-oriented program components to create code.

21. The computer program product of claim 19, said program components of said program instructions for said analyzing are object-oriented program components and said program instructions for said analyzing further include program instructions for:

introspecting said program components wherein behavior patterns of said object-oriented program components are determined;

comparing said behavior patterns with known patterns of predetermined general classes of a framework; and connecting said object-oriented program components together based on said behavior patterns and connection patterns of said general classes.

22. The computer program product of claim 20, wherein said emitting and associating functions in said program instructions are instantiated within an object oriented programming environment and wherein said object oriented programming environment includes Common Object Request Broker Architecture component broker environment.

23. The computer program product of claim 20, wherein said object-oriented program components generated in said program instructions for emitting include Java Bean components.

24. The computer program product of claim 20, wherein said object data files utilized in program instructions for said emitting include interface definition language (IDL) files from a component broker environment.

25. The computer program product of claim 19, wherein said pre-defined class patterns in said program instructions include attributes, methods, and parameters of said program components.

26. The computer program product of claim 20, wherein said software routine created by said program instructions for said emitting, introspecting, and wiring is executed within a Common Object Request Broker Architecture (CORBA) environment comprising of a framework, proxy objects, and CORBA objects.

27. The computer program product of claim 26, further comprising program instructions for enabling said framework to communicate with said CORBA objects via said proxy objects providing user manipulation of data during execution of said software routine.

* * * * *

UNITED STATES PATENT AND TRADEMARK OFFICE
CERTIFICATE OF CORRECTION

PATENT NO. : 6,637,020 B1
DATED : October 21, 2003
INVENTOR(S) : Hammond

It is certified that error appears in the above-identified patent and that said Letters Patent is hereby corrected as shown below:

Column 17,
Line 50, after "manipulation" please delete "and manipulation".

Signed and Sealed this

Twenty-eighth Day of December, 2004

JON W. DUDAS
*Director of the United States Patent and Trademark Office*